United States Patent
Monk et al.

(10) Patent No.: US 7,154,957 B1
(45) Date of Patent: Dec. 26, 2006

(54) POWER SPECTRUM SHAPING TO REDUCE INTERFERENCE EFFECTS IN DEVICES SHARING A COMMUNICATION MEDIUM

(75) Inventors: Anton Monk, San Diego, CA (US);
Edward Warner, San Diego, CA (US);
Itzhak Gurantz, San Diego, CA (US);
Ladd Elwardani, La Jolla, CA (US);
Ron Porat, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 808 days.

(21) Appl. No.: 10/386,094

(22) Filed: Mar. 10, 2003

Related U.S. Application Data (60) Provisional application No. 60/385,361, filed on Jun. 3, 2002, provisional application No. 60/363,420, filed on Mar. 12, 2002.

(51) Int. Cl.
*H04L 5/12* (2006.01)
*H04L 23/02* (2006.01)

(52) U.S. Cl. .................. 375/261; 375/219; 375/227; 375/346; 375/298

(58) Field of Classification Search ............ 375/222, 375/219, 220, 295, 227, 346, 261, 298; 379/27.01, 379/1.04; 370/201
See application file for complete search history.

(56) References Cited

U.S. PATENT DOCUMENTS

| | | | |
|---|---|---|---|
| 6,246,716 B1 * | 6/2001 | Schneider | 375/220 |
| 6,339,613 B1 * | 1/2002 | Terry | 375/227 |
| 6,445,773 B1 * | 9/2002 | Liang et al. | 379/1.04 |
| 6,532,277 B1 * | 3/2003 | Ulanskas et al. | 379/27.01 |
| 6,650,697 B1 * | 11/2003 | Tate et al. | 375/222 |
| 2003/0086362 A1 * | 5/2003 | Hasegawa et al. | 370/201 |

\* cited by examiner

*Primary Examiner*—Phuong Phu
(74) *Attorney, Agent, or Firm*—Michael W. Landry (57) ABSTRACT

A broadband digital communication network transmits a signal with a shaped power spectrum to minimize interference with devices that share the communication medium. In one embodiment using coaxial wiring, devices such as cable converters and televisions that are not part of the network share the communication medium and are exposed to the network signal. Power levels across the network band are selected to reduce interference in the non-networked devices. One area of susceptibility is the tuner of cable channel receivers, which perform mixing and down conversion of RF signals. The power spectrum profile is selected to minimize the IF and base band interference after down conversion. The spectrum can be shaped within each 6 MHz band to further minimize the interference with a TV signal. The power levels can be optimized for both peak power limitation and quantization effects.

10 Claims, 9 Drawing Sheets

FIG. 3
Interference Test

POWER SPECTRUM SHAPING TO REDUCE INTERFERENCE EFFECTS IN DEVICES SHARING A COMMUNICATION MEDIUM

RELATED APPLICATIONS

This application claims the benefit of provisional patent application 60/363,420 filed Mar. 12, 2002 entitled "Method of bit and energy loading to reduce interference effects in devices sharing a communication medium" and provisional patent application 60/385,361 filed Jun. 3, 2002 entitled "Power Spectrum Shaping To Reduce Interference Effects In Devices Sharing A Communication Medium".

BACKGROUND

Figure 1:
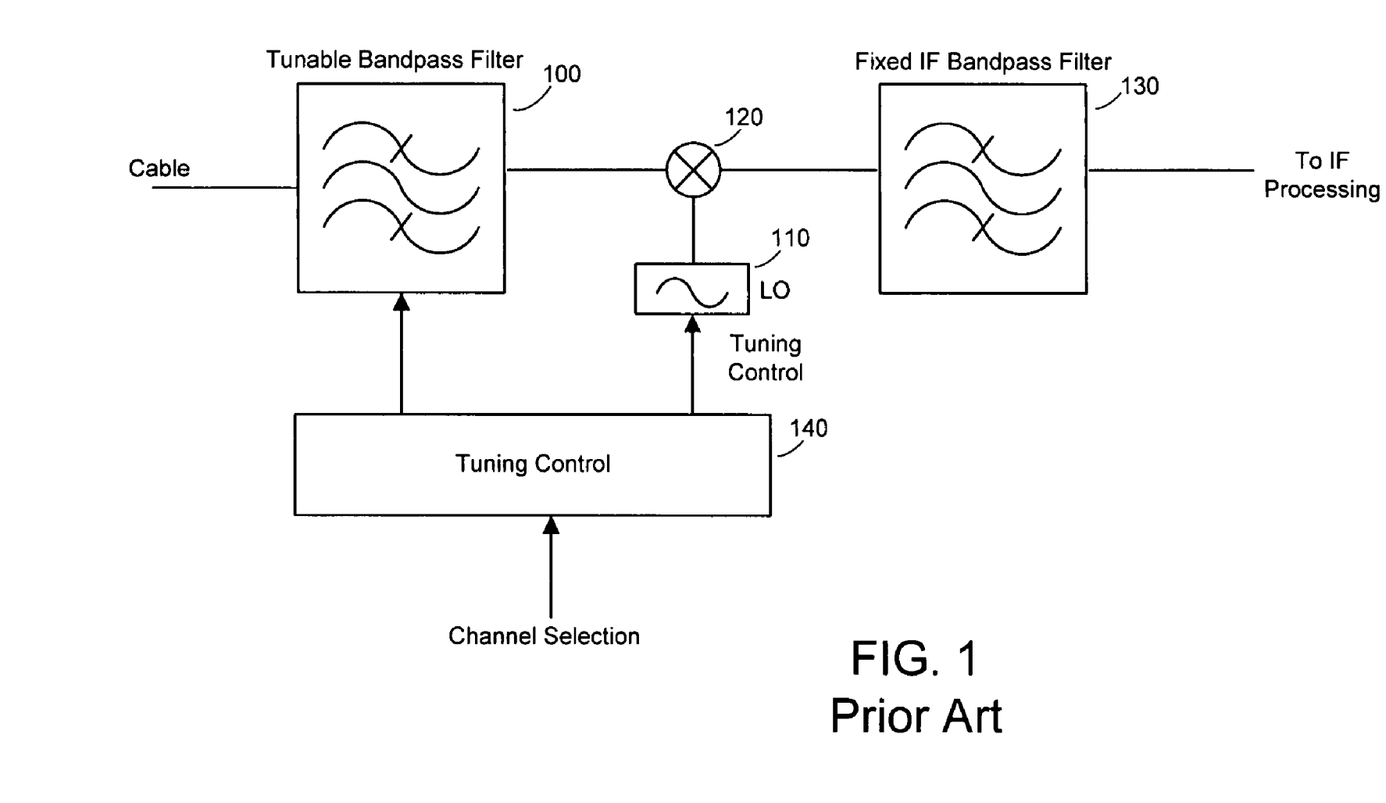
FIG. 1 shows a block diagram of a single conversion tuner commonly found in televisions, VCRs, and set top boxes.
Figure 2:
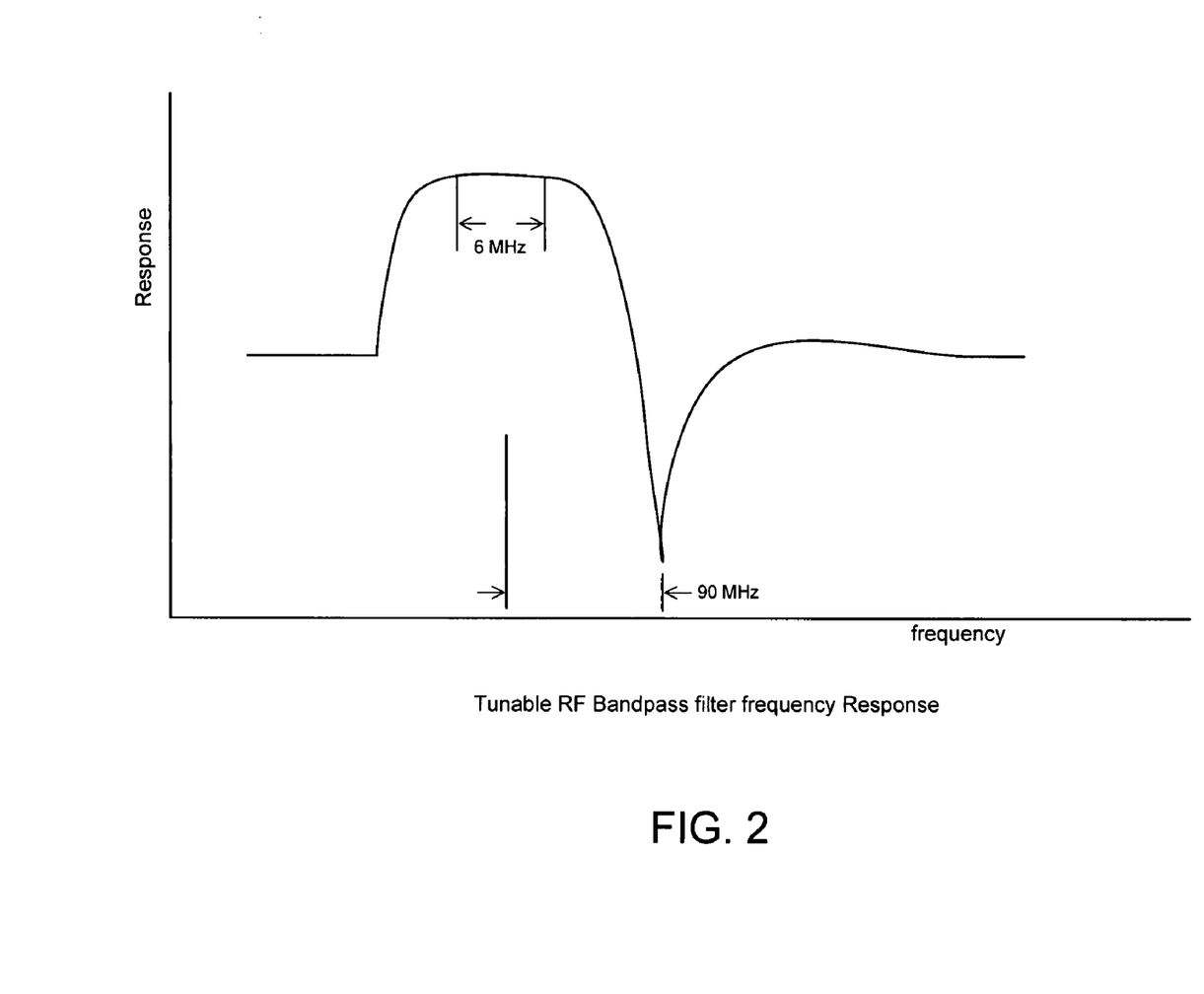
FIG. 2 shows the frequency response of typical tunable RF band pass pre-selection filter of a tuner.

A tuner performs frequency down conversion to translate a specific TV channel at a selectable RF frequency to a fixed IF frequency for further processing. Referring to FIG. 1, a conventional direct conversion tuner comprises tunable tracking band pass filter 100, local oscillator (LO) 120, mixer 110, and fixed IF band pass filter 130. Tracking filter 100 of approximately 10 to 20 MHz in bandwidth is tuned to center around the desired channel. In high side mixing operation, LO 120 is tuned to a frequency of $F_{ch}+F_{if}$, where $F_{ch}$ is the center frequency of the desired channel and $F_{if}$ is the IF frequency of the IF band pass filter. A low side mixing operation would use an LO frequency of $F_{ch}-F_{if}$. Tuning control 140 produces analog or digital signals to tracking filter 100 and LO 110 according to the selected channel. Mixer 120 produces frequency terms that are the sum and difference of the LO and RF signals, and the sum and difference of harmonics of the LO and RF signals. One of these mixer term is the RF signal image at the IF frequency. IF band pass filter 130 removes the other mixer output terms. IF band pass filter 130 is typically 6 MHz wide centered at 44 MHz for a North American TV system. Other regions use different channel spacing and IF filter bandwidths.

Tracking filter 100 has a pass band response that passes one 6 MHz channel as well as some or all of several adjacent channels and may comprise other functions such as automatic gain control (AGC) and amplifiers. Tracking filter 100 provides a pre-selection function to limit the power input to mixer 120 and reduces the possible mixer term outputs. There are two possible frequencies that will produce images of the RF signal falling within the IF band pass filter after the mixing operation. The desired channel is 44 MHz below the LO frequency. An undesired channel is 44 MHz above the LO frequency. Tracking filter 100 is designed to have a deep null in the transfer function approximately 90 MHz above the center of the desired channel to provide a high degree of rejection of this undesired channel.

Tracking filters are designed for operation over the cable frequency band of 50 to 750 MHz or TV broadcast band of 50 to 800 MHz. The tracking filters have a specified rejection over the operating band but have an unspecified rejection outside the intended operating band.

The RF and post IF processing is sensitive to signals at $F_{LO}+/-F_{IF}$, and is also sensitive to frequencies at multiples of the LO frequency. Interference is caused when energy is present in the signal at $(N \times F_{LO})+/-F_{IF}$, where N is an integer. These frequencies will be translated by the mixer to the IF frequency and pass through the IF band pass filter.

Various aspects of television signals, tuners, cable propagation characteristics, and frequency usage are disclosed in W. Ciciora, et al, *Modern Cable Television Technology*, 1999, Morgan Kaufmann Publishers, Inc., incorporated herein by reference.

The undefined rejection of the tracking filter of tuners outside the intended signal band combined with the sensitivity of the mixer to these frequencies makes the TV receiver or set top box susceptible to energy emission present on the input signal. This creates a problem when other signals are transmitted on a cable carrying television signals.

Bit loading and power loading algorithms have been applied to peak power limited multicarrier systems, such as asynchronous digital subscriber loop (ADSL) systems. One approach is described in Enzo Baccarelli, et al., *Novel Efficient Bit-Loading Algorithms for Peak-Energy-Limited ADSL-Type Multicarrier Systems*, IEEE Transaction on Signal Processing, Vol. 50, No. 5, May 2002.

SUMMARY OF THE INVENTION

The spectrum of an RF signal is shaped to have varying power levels over the occupied frequency band for the purpose of reducing interference from network signals into non-network devices sharing the medium. Lower power levels are transmitted in bands where devices have a lower interference threshold and are therefore more susceptible. Higher powers are transmitted at frequencies where devices have a higher interference threshold. The transmitted power spectrum is established to take into account the susceptibility of common devices such as VCRs and TVs that share the communication medium with digital network devices. One application employing the invention is a broadband digital communication network using multi-carrier modulation with variable energy and modulation order for each carrier. Another application is a broadband digital communication network using quadrature modulation of a single carrier, such as QAM.

In one embodiment using coaxial wiring, devices that are not part of the network share the communication medium and are exposed to the network signal. Specific carrier power profile is selected to reduce interference in the non-networked devices. One area of susceptibility is the tuner of cable channel receivers, which perform mixing and down conversion of RF signals. The carrier energy loading is selected to minimize the IF and base band interference after down conversion. In one embodiment, susceptible devices are characterized and a power level table is created to control the carrier levels at each frequency in a multicarrier modulator. Alternatively, the power level table can be use to control transmit precoding of a QAM waveform.

In another embodiment, energy loading is selected within each 6 MHz band to minimize the interference with a TV signal. This additional loading technique is used to further reduce interference by loading power within 6 MHz regions of the frequency band used by the network signal. This loading profile reduces power levels at frequencies that correspond to the visual and color carriers in an image of the network signal. Bit loading and power loading is calculated taking into account the effects of quantization noise to maximize total throughput for all carriers.

The present invention uses transmitted power spectrum shaping to reduce interference in devices that do not use the frequency used by the network devices.

DETAILED DESCRIPTION OF THE INVENTION

Figure 9:
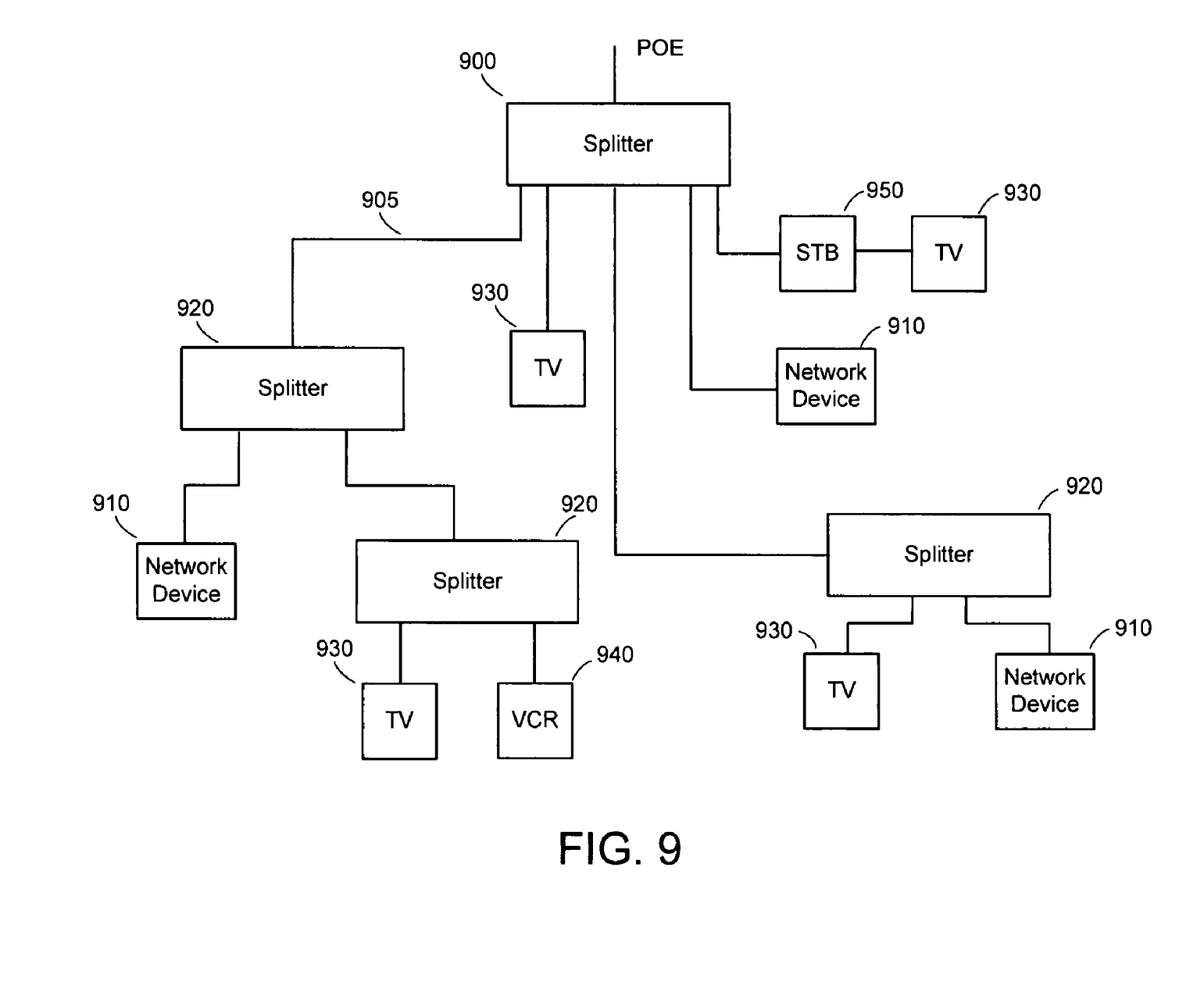
FIG. 9 shows a diagram of network devices and non-network devices connected to home cable wiring.

Referring to FIG. 9, coaxial cable 905 is run through a house or building and provides signal distribution of television signals provided by a cable TV operator or from a satellite TV system. Network devices 910 use digital modulation to communicate over the same coaxial wiring at frequencies not used by the TV services.

A cable TV service has splitter 900 at the point of entry to a house. The signal is split among several cables which run to the various rooms of the house. Alternatively element 900 represents a crosspoint switch of a satellite system out door unit, which provides distribution of the satellite IF signal to receiver devices. Televisions 930 can be connected through a coax cable directly to splitter 900, or the signal may pass through other splitters 920 at other points in the wiring branches. A VCR 940 is an example of another non-network device. A TV may receive a signal from a converter set top box (STB) 950. Network devices 910 can be located at any point in the wiring branches.

TV 930, STB 950, and VCR 940 are non-network receive only devices. Network devices 910 receive and transmit power. Coaxial wiring 905 and splitters 900 and 920 provide a path for communication between network devices 910 and allow the transmitted network signal to be coupled into the non-network devices.

Interference susceptibility of a device such as a TV, STB, or VCR, the most common non-network devices, can be measured by sweeping an interfering signal across a band of frequencies and observing the effect on a picture. Broadband noise or a single frequency carrier can be the interfering signal. The interference effect can be observed visually for degradation in picture, or measured with test equipment, for example with a Tektronix VM-700T video test set, to detect an increase in noise present in the signal. A threshold for acceptable noise increase could be 1 to 2 dB. An interfering noise source can be a band limited noise generator with power uniformly distributed over a predetermined bandwidth, 6 MHz for example. Another interfering signal can be modulated data with post modulation filtering to define the bandwidth of the signal. One example is pseudorandom data modulated with a double sideband suppressed carrier modulator at 6 mega symbols per second and filtered with a square root raised cosine filter with excess bandwidth of 10%. This would yield a signal spectrum slightly greater than 6 MHz. Interfering noise of greater than 6 MHz can be used. The tuner IF filter will reject most of the interfering signal outside the IF pass band.

Figure 3:
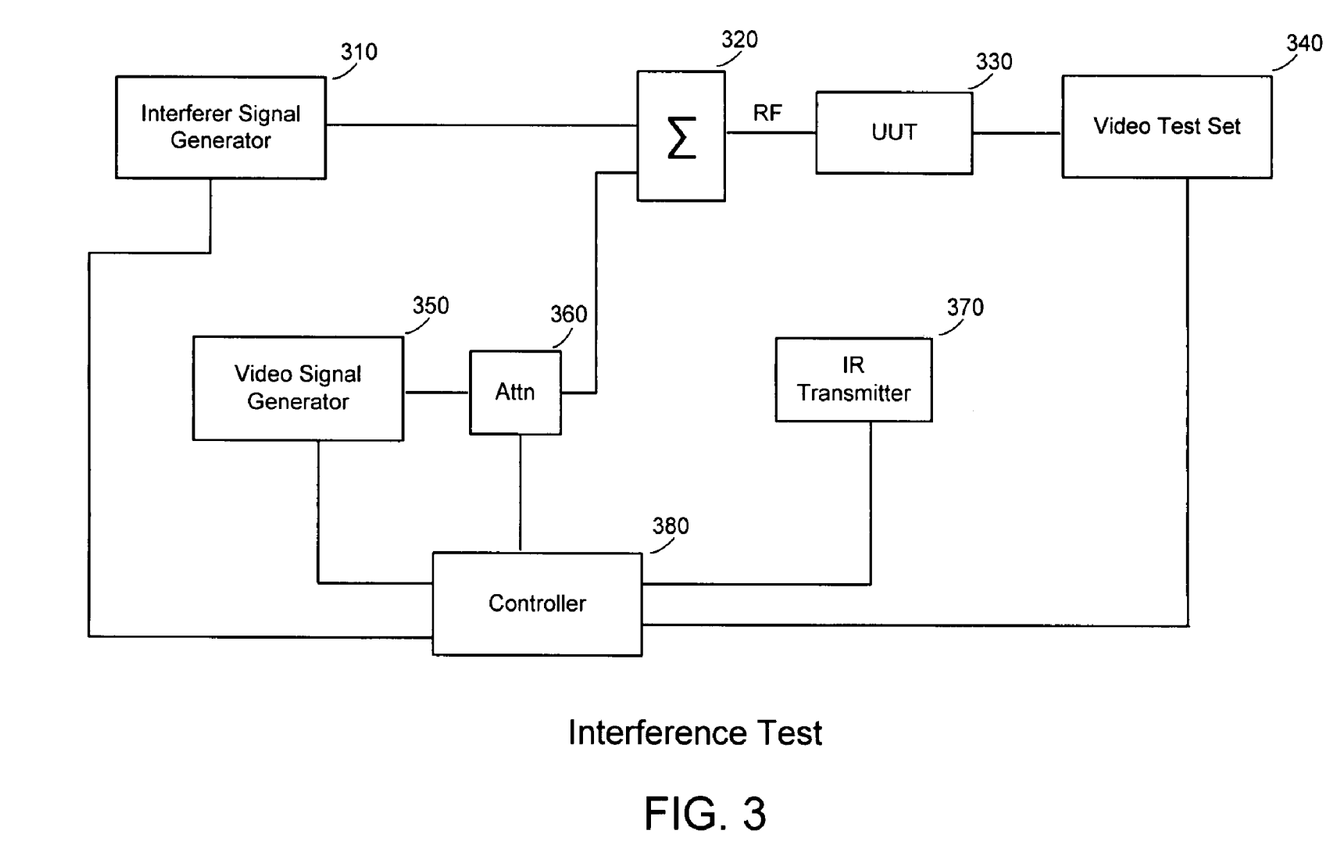
FIG. 3 shows a diagram of an interference test set up in accordance with the present invention.
Figure 4:
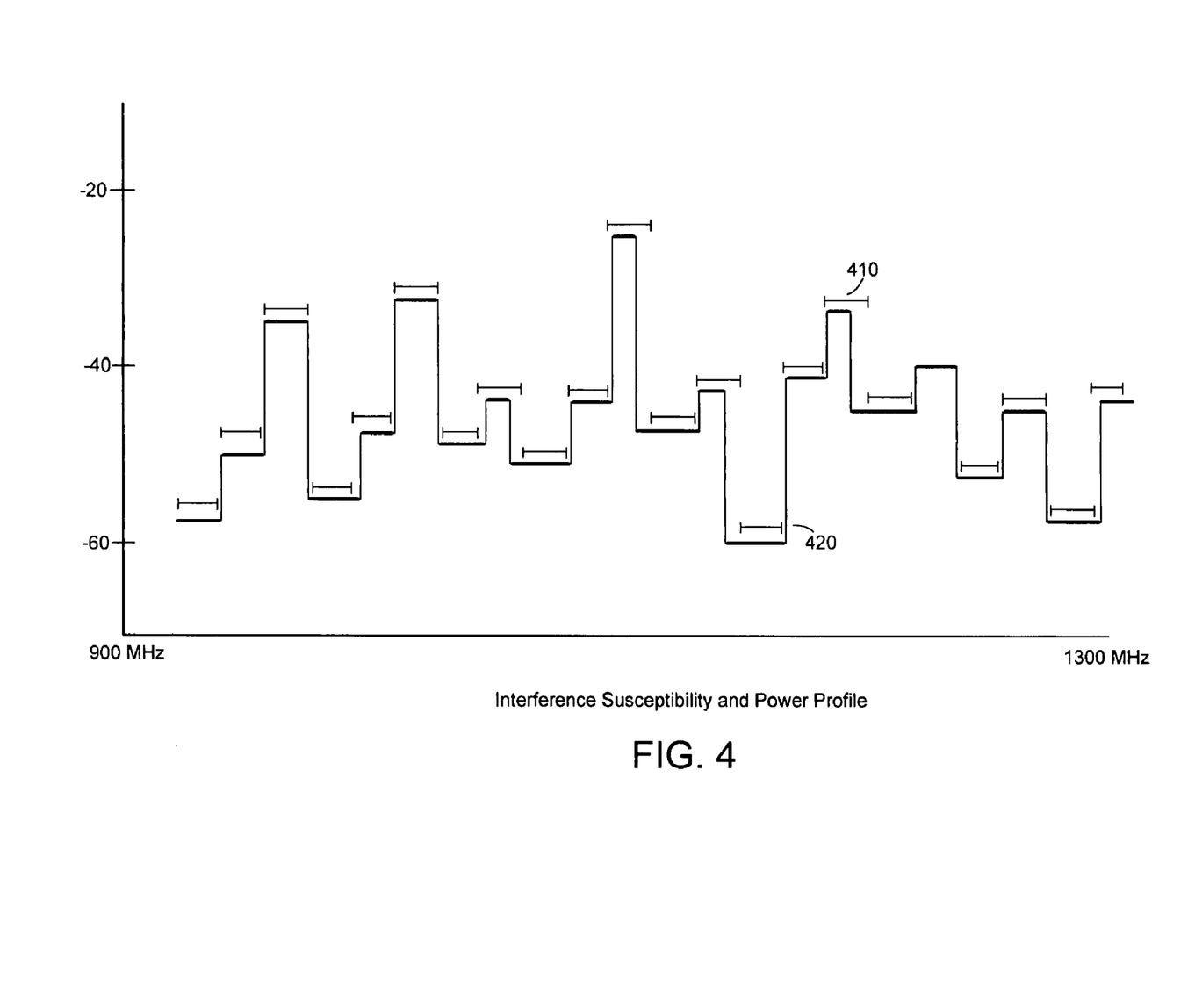
FIG. 4 shows a transmitted power profile in accordance with the present invention.

FIG. 3 shows a test configuration for determining susceptibility of a device. Unit under test (UUT) 330 receives an RF signal that is the sum of a video signal from a video signal generator 350 and an interfering signal from an interferer signal generator 310. The two signals are combined with summer 320, a standard coaxial RF splitter/combiner. The video signal can be generated with standard test equipment, such as Sencore Universal Video Generator VG91, which produces a test pattern and modulates to a selected channel carrier frequency. The interferer can be a standard signal generator such as an Agilent HP8657 RF signal generator, or a modulating signal generator such as Agilent E4436B. An attenuator 360 allows selection of the video signal power level; an internal attenuator in the interferer signal generator 310 allows selection of the interfering signal power level. Each of these devices can be connected to a controller 380, a personal computer for example, over an IEEE-488 bus or RS-232 serial port. The controller 380 allows automation of the testing. The base band video output of the UUT 330 connects to the video test set 340, which performs a measurement of noise present in the video signal. An IR transmitter 370 under control of the controller 380 sends channel commands to the UUT 330 to select the channel to test.

In one embodiment, testing of the video signal is done by measuring noise during the active region of one or more horizontal lines. Lines from 16 to 20 can be used because these generally do not have active video transmitted.

A quantitative measure of interference susceptibility is calculated and referred to as threshold of visual impairment (TOV).

The interferer is swept, stepped, or arbitrarily commanded to frequencies which map to the tuner IF frequency according to the formula N*Flo+/−Fif. N is an integer, Flo is the LO frequency used by the tuner to tune to a particular channel, Fif is the IF frequency at the output of the tuner, typically 44 MHz. Due to the nature of certain mixers, the susceptibility may be different at different harmonics of Flo.

By measuring a number of devices the worst-case susceptibility can be determined for a class of devices or all devices. In practice, a small percentage of devices will have susceptibility that is worse than other devices. Accommodating the few devices that are highly susceptible is an economic decision, whether it is worth lowering transmitted power to all devices to avoid interference with the high susceptibility devices.

Energy/Power Loading within 6 MHz Bands.

Figure 6:
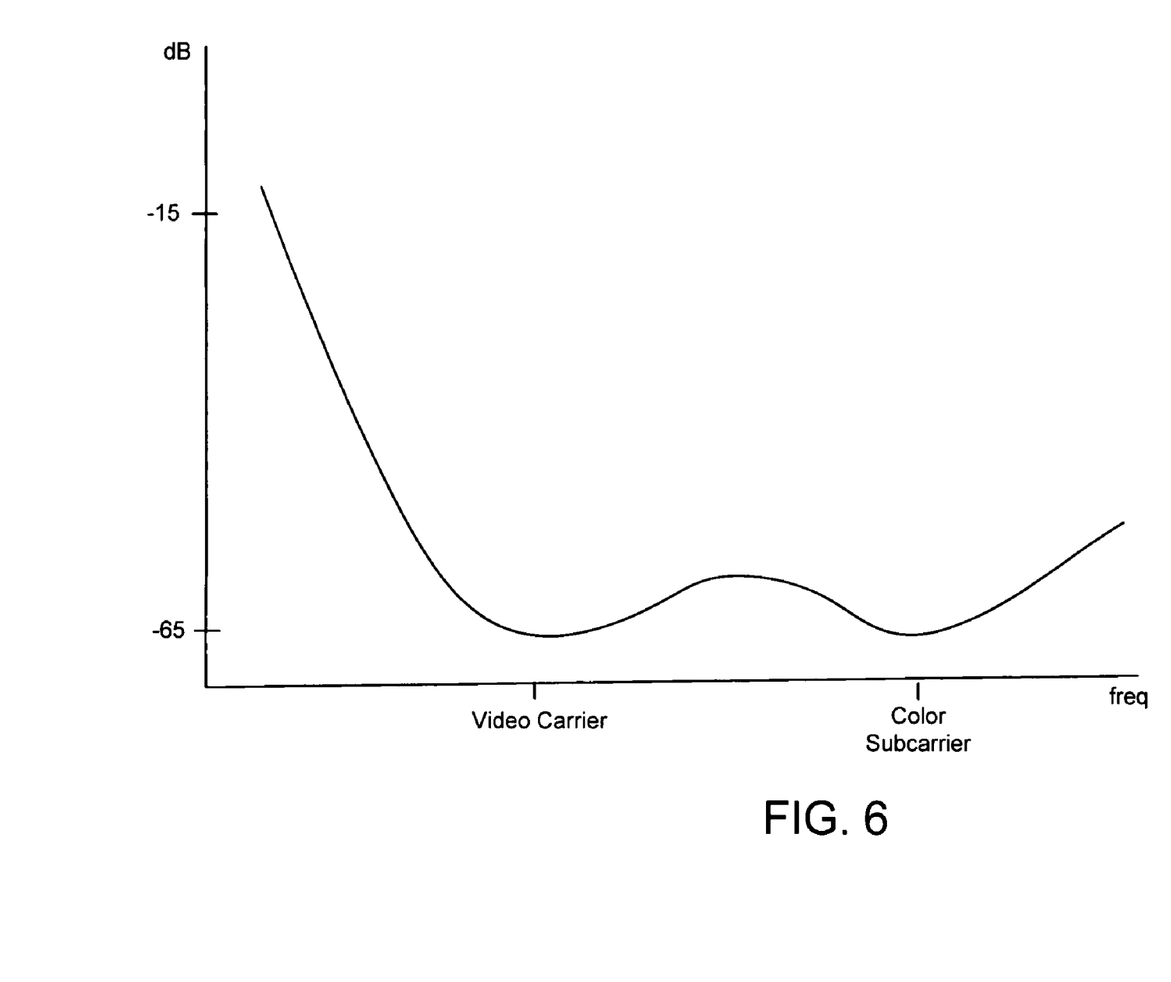
FIG. 6 shows a curve of power susceptibility over a television channel band.
Figure 7:
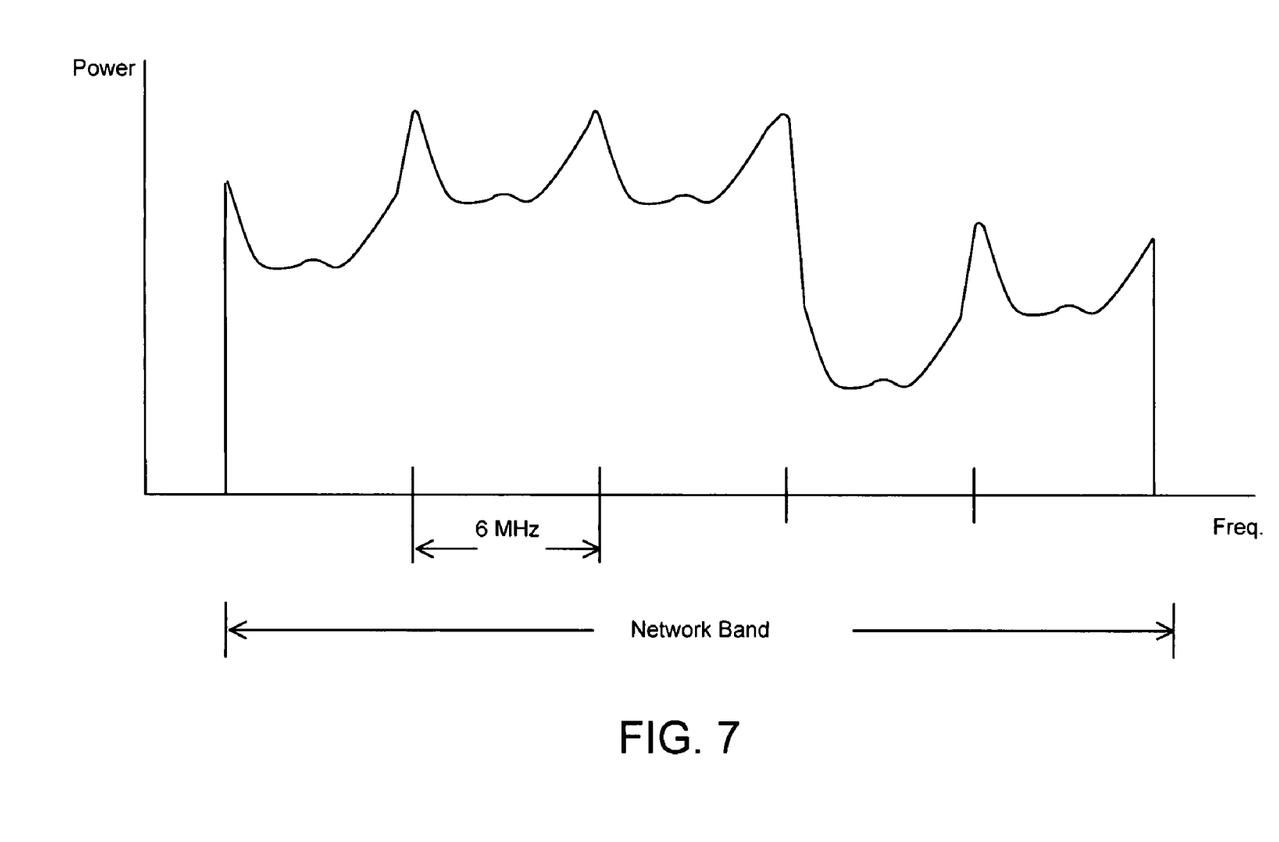
FIG. 7 shows a transmitted power profile with a repeating sub-profile in accordance with the present invention.

Within a 6 MHz band occupied by a TV signal, different frequencies have differing levels of susceptibility to interference. This is due to filter pass band characteristics in the signal processing, the location of carriers and subcarriers, and human visual sensitivity. FIG. 6 shows a curve of perceptible interference levels. Frequencies near the visual carrier and color subcarrier are more susceptible to interference. Energy is loaded within 6 MHz bands and the sub-profile is repeated over the whole band used for network signaling, as shown in FIG. 7. Although the network devices do not transmit directly on television frequencies, any residual mixer image frequency of the network signal passing into the IF chain can cause interference. By loading the power within specific 6 MHz bands that make up the network signal using a power sub-profile, interference can be minimized further. The band of the power loading sub-profile may be some other frequency determined by the channel spacing of the TV signal or other non-network signals. The sub-profile may be applied with a spectral inversion in the cases where the interference is caused by the difference mixing product.

Interference images of the network signal can occur at positive and negative frequencies corresponding to the +/−$F_{if}$ image at the output of the mixer. Thus, two spectral inversions of the interfering signal are possible. An additional technique can be employed where the sub-profile is symmetric across the television band. This provides effective sub-profile power loading for all images of the signal, both with and without spectral inversion.

The transmitted power of network communications may be higher than TV signal power, which is typically −10 dBmV to +10 dBmV. Communication from network device to network device will generally occur through splitters, and TV devices will also be isolated by splitters. The splitter port isolation is nominally 18 dB but could be as bad as 8 dB. The result is that received power levels of network signals relative to TV signals can be high enough to cause interference.

OFDM Waveform Modulator and Demodulator

Multi-tone modulation uses a set of modulating carriers that are integer multiples of a common frequency and the symbol period is the inverse of the common frequency. Multi-tone modulation is also called discrete multi-tone (DMT) and orthogonal frequency division multiplexing (OFDM). OFDM utilizes quadrature phase shift keying (QPSK) and multi-level quadrature amplitude modulation (QAM) wherein each OFDM carrier can be modulated by an amplitude/phase-varying signal. To modulate, data bits are encoded into a number of m-ary PSK or QAM constellations, which then modulate the respective carriers. The carriers are summed together for transmission over the channel. Each carrier is independent and can be independently decoded in the receiver. All carriers are related in frequency, being an integer multiple of a base frequency.

In OFDM, the user data bits generated at a high rate are distributed over many carriers, each with a lower data rate and therefore longer symbol period. For example, if a data rate of 100 mbps is modulated using QPSK, which provides 2 bits per symbol then the symbol period is 20 nS. Using OFDM with 100 carriers, the data rate of each carrier is 1 mbps. With QPSK modulation the symbol period for each carrier is 2 uS.

OFDM provides a mechanism to overcome the frequency selective channel impairments present in coaxial building wiring.

QPSK is composed a sine and a cosine wave carrier of identical frequency with phase modulation applied to each carrier independently. QAM is composed of sine and cosine waves with phase modulation and amplitude modulation. Both of these signals can be represented using complex numbers. The OFDM waveform is generated by applying an inverse discrete Fourier transform (IDFT) to a complex vector of these constellation that results in a real valued time domain sequence. The time domain sequence is applied to an up converter to place the waveform at the proper RF frequency.

Higher SNR channels can support higher data capacity. Frequency bins occupying parts of the channel where the SNR is high can be used to transmit more bits. Each carrier may be modulated with a different order constellation, where higher SNR frequencies can bear a higher order constellation, and the resulting closer spacing of the constellation points. Frequencies with the lower SNR use lower order constellations such as QPSK.

The power in individual frequency bins can be adjusted to compensate for path loss that varies as a function of frequency. The power level in regions of the channel can be altered by scaling the complex valued vector for the bins where power adjustment is needed before applying the inverse Fourier transform. In order to avoid interference with certain bands in the RF spectrum, the power level of certain bins can be reduced to zero.

Figure 5:
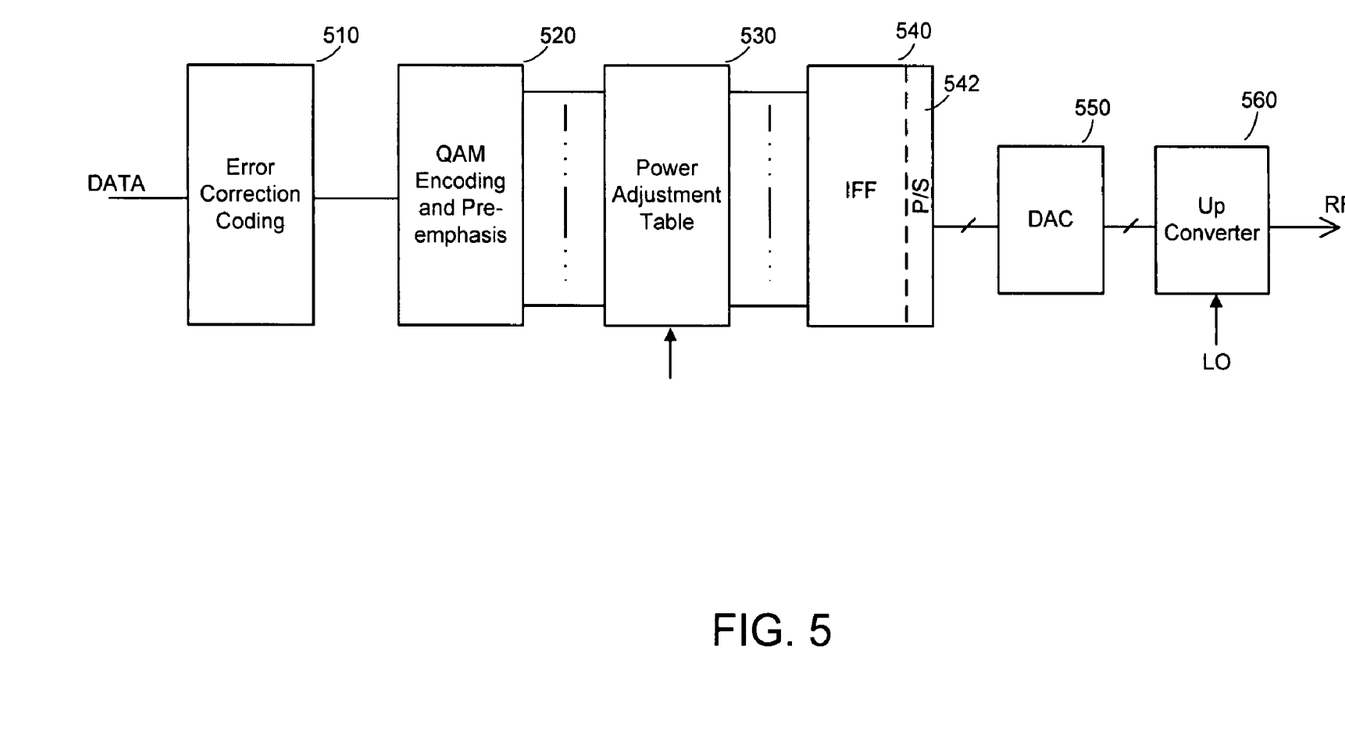
FIG. 5 shows a block diagram of a modulator in accordance with the present invention.

FIG. 5 shows a block diagram of a representative OFDM modulator according to the present invention. Data input is optionally coded with check bits by error correction coder 510 to facilitate error correction in the receiver. QAM encoder 520 divides the input data into many bit streams and applies a QAM symbol mapping to each bit stream. The bit streams correspond to the carriers. Symbol mapping maps a short sequence of bit, from 2 for QPSK to 8 for 256-QAM, into an I and Q amplitude value. The I and Q amplitude values output from QAM encoder 520 are modified by power adjustment table 530, which adjusts the amplitude levels to effect the power level of each carrier in the transmitted signal. The values in power adjustment table 530 are empirically derived or analytically derived and set to levels that avoid interference with other devices. Inverse Fast Fourier Transform (IFFT) 540 performs a frequency domain to time domain transformation that converts the complex series of frequency amplitude values into a time sequence. The IFFT output array is converted to a serial data stream by a parallel to serial converter 542 as part of IFFT 540. The digital time sequence is converted to an analog representation by digital to analog (DAC) 550. The analog signal is translated to a suitable carrier frequency by up converter 560. The time sequence can be either real valued or complex valued samples. In the case of complex values, DAC 550 would be a dual DAC and up converter 560 would be a quadrature modulator. An amplifier provides the appropriate overall power for the signal to be inserted into the communications medium.

Power adjustment table 530 may also be used to influence the order of modulation generated by QAM encoder 520 for each of the carriers. Higher power level carriers can support higher order of modulation and lower power levels require lower order modulation. The selection of QAM modulation order is bit loading, the selection of carrier power is power loading. Using the present invention, the power profile used to avoid interference can alter both the power in each carrier and the number of bits transmitted in each symbol of each carrier.

An OFDM receiver uses a discrete Fourier transform (DFT) to convert the modulated signal back into data. The OFDM receiver receives all the carriers at once and performs the transform on a block of data points. Drawing from terminology used in Fourier transforms, the frequency channels in OFDM may be called frequency bins or simply bins.

OFDM system architecture is covered in *ADSL/VDSL Principles* by DR. Dennis J. Rauchmayer, Macmillan Technical Publishing, 1999 and *DSL Simulation Techniques and Standards Development for Digital Subscriber Line Systems* by Dr. Walter Y. Chen, Macmillan Technology Publishing, 1998, incorporated herein by reference. Broadband networks are described in U.S. Pat. No. 5,889,765 Bi-directional communications Network issued to Gibbs, U.S. Pat. Nos. 5,940,387 and 6,005,861 Home Multimedia Network Architecture issued to Humpleman, U.S. Pat. No. 5,870,513 Bi-directional Cable Network with a Mixing Tap or Suppressing Undesirable Noise in Signals From a Remote End of the Network issued to Williams, U.S. Pat. No. 5,805,591 Subscriber Network Interface issued to Naboulsi, U.S. Pat. No. 6,008,368 Ethernet Transport Facility Over Digital Subscriber Lines issued to Rubinstain, U.S. Pat. No. 6,137,793 Reverse Path Multiplexer for Use in High Speed Data Transmissions issued to Gorman, and U.S. Pat. No. 6,091,932 Bi-directional Point to Multipoint Network Using Multicarrier Modulation issued to Langlais, each of which is incorporated herein by reference.

Gibbs discloses a broadband network overlaid with the cable service frequencies using dynamically allocated TDMA protocols. Humpleman patents disclose a home network using an active network interface unit to couple the home network to the external network. Williams discloses a method of reducing noise accumulated in the frequency bands used by an upstream signal. Naboulsi discloses an active network interface for an asynchronous transfer mode (ATM) network. Rubinstain discloses a method of transporting Ethernet over twisted pair lines. Gorman discloses an active reverse path multiplexer for communication between the cable head-end and subscriber cable modems. Langlais discloses a two-way data transmission system for communicating between an upstream and downstream unit using OFDM.

U.S. Pat. No. 6,091,932, Bidirectional Point to Multipoint Network Using Multicarrier Modulation, issued to Langlais, incorporated herein by reference, discloses various techniques for implementing OFDM communication. This reference discloses the use of OFDM for communicating between a terminal device and the cable head-end.

U.S. Pat. No. 5,959,967, issued to Humphrey discloses an OFDM transmission system used to communicate over a twisted pair loop. U.S. Pat. No. 5,371,548, issued to Williams discloses an OFDM system for data transmission during the vertical blanking interval of a television signal. U.S. Pat. No. 5,488,632, issued to Mason discloses additional techniques for implementing an OFDM modulator and demodulator. U.S. Pat. No. 3,488,445, issued to Chang and U.S. Pat. No. 3,511,936, incorporated herein by reference, disclose OFDM data transmission techniques. Each of these patents is incorporated herein by reference.

Bit and power loading is disclosed in the following references: Zogakis et al., U.S. Pat. No. 5,774,500, Multichannel Trellis Shaper; Jones, U.S. Pat. No. 6,310,909, DSL Rate Adaption; Cioffi, U.S. Pat. No. 5,519,731, ADSL Compatible Discrete Multi-tone Apparatus for Mitigation of T1 Noise; each of which is incorporated herein by reference. Energy loading and power loading refer to the same process of allocating differing amounts of the total signal to different areas of the spectrum.

In addition to OFDM, the present invention can be applied to other modulation types, such as QPSK, QAM, and direct sequence spread spectrum (DSSS). Any signal can be precoded to produce a non-uniform power spectrum to address the interference susceptibility of the non-networked devices. A fixed or adaptive equalizer in the receiver can be used to compensate for the preceding performed in the transmitter.

Precoding of the transmitted signal can be performed using known techniques. One technique is the Tomlinson-Harashima precoding. Precoding is disclosed in the following references: Sellars, U.S. Pat. No. 6,324,220, Stabilized Precoder For Data Transmission; Bremer et al., U.S. Pat. No. 6,307,893, System and Method for Transmit Signal Spectral Shaping; Olafsson et al., U.S. Pat. No. 6,278,744, System for Controlling and Shaping the Spectrum and Redundancy of Signal-Point Limited Transmission; Langberg et al., U.S. Pat. No. 6,243,425, Adaptive Precoding System and Method for Equalizing Communication Signal; Demjannenko et al., U.S. Pat. No. 6,222,890, Variable Spectral Shaping Method for PCM Modems; Wei, U.S. Pat. No. 5,559,561, Coded Modulation with Shaping Gain and Tomlinson Precoding; Betts, U.S. Pat. No. 5,559,835, Method and Apparatus for Encoding Data for Transfer Over a Communication Channel; each of which is incorporated herein by reference.

The receiver equalizer can be a frequency domain equalizer, which performs a FFT on a block of symbols, modifies the amplitude of each frequency bin, and converts the signal back to a time sequence with an IFFT. An FIR filter with precomputed tap coefficients can be used to equalize the signal. The tap coefficients are the Fourier transform of the spectral preceding. Either equalizing technique can be adaptive. Well known data directed or decision feedback equalizers adapt the filter coefficients to compensate for variations in the frequency spectrum.

Figure 8:
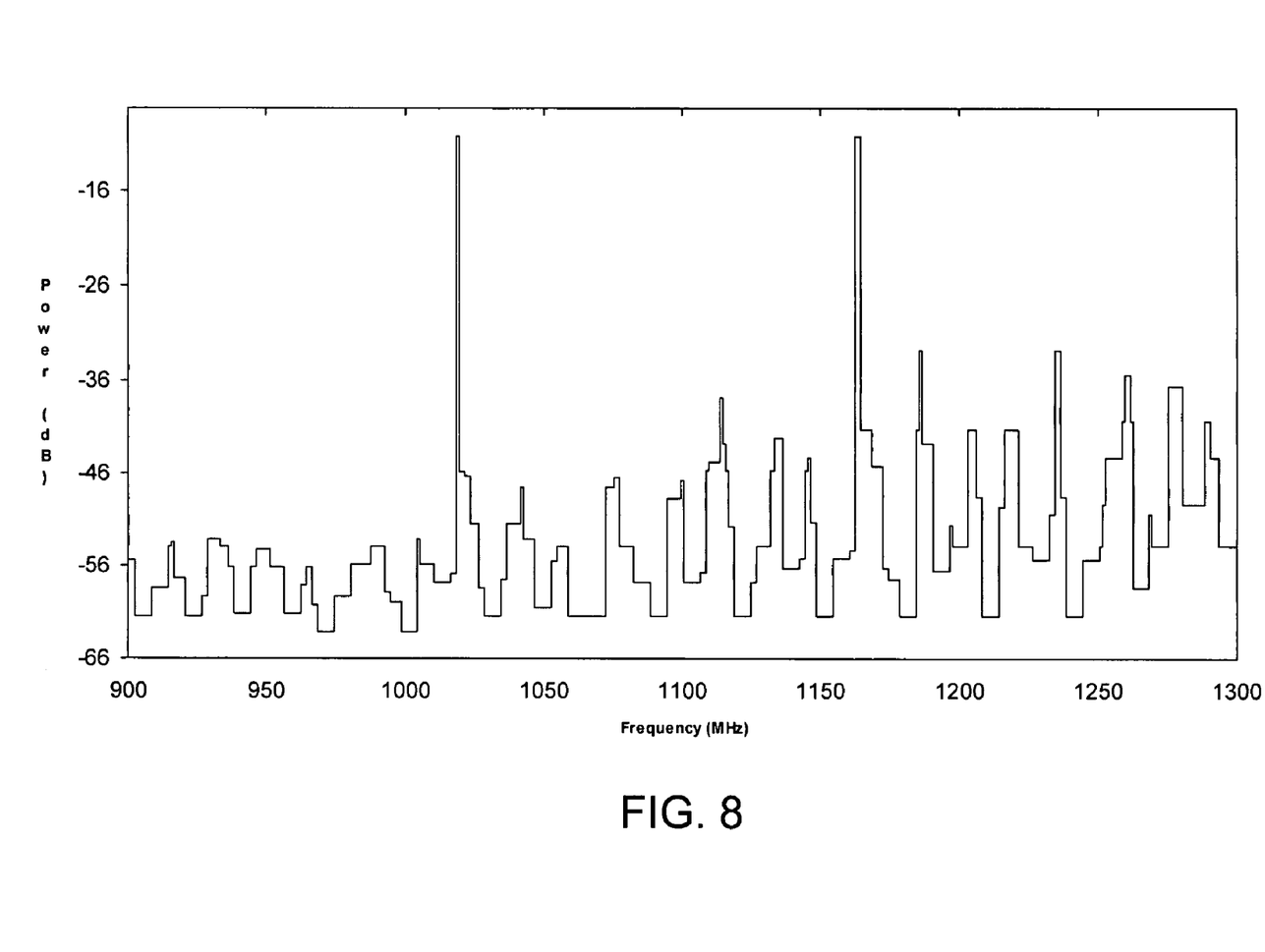
FIG. 8 shows a profile of power representing the threshold of visual distortion resulting from the test of cable TV set top boxes.

FIG. 8 shows a profile of power level susceptibility for a group of cable TV set top converter boxes. This profile is representative of other devices, such as VCRs and television sets. The power levels in FIG. 8 represent the threshold of visual distortion that is created by a given power at a given frequency. The visual distortion is measured at all tunable channels that have a possibility of creating mixing products that translate into the IF band. This profile is used to set the power levels transmitted at each frequency. The power levels transmitted may follow an approximation of the measured profile.

There may be large difference in power levels for each bin because some bins can transmit high power levels without causing interference and other bins must transmit low power levels to avoid interference. This large variation in power levels presents problems in a fixed point implementation of a communication system.

In Baccarelli, cited above and incorporated herein by reference, the problem of maximizing the throughput of an OFDM system given a constraint on the allowable transmit power per bin is analyzed. In practical implementation of communication modems only a limited number of bits are used which raises issues of quantization and dynamic range. In particular, in order to transmit different powers per bin we multiply the signal before the IFFT in the transmitter by a gain factor $g_i$ which is the square root of the allocated power for that bin. Another gain is used after the IFFT to normalize the total transmit power to a certain predetermined value irrespective of the particular power spectrum constraint.

For example, for a 10-bit input to the IFFT, the gain factor $g_i$ could be an 8 bit number receiving the values 1 through 256, where 256 is the highest value assigned to the bin with the highest allocated power. The dynamic range is limited and lower gains will increase the quantization noise. In the case of constant power spectrum we can allocate all bins the highest gain providing low enough quantization noise for even very high constellation sizes.

A problem arises when a certain bin can support high constellation, say 256 QAM, assuming floating point implementation, but due to a higher allowable power on a different bin is forced to scale down its gain factor and thus increases the quantization noise and reduce throughput. This can happen if a bin with greater channel attenuation is allowed higher transmit power. It is desirable to use that increased allowable power to get higher throughput in that bin, but in a fixed point implementation that might come at the expense of a different bin experiencing lower gain factors and higher quantization noise.

A mathematical representation of the problem using the notation of Baccarelli, is $$SNR_q(i) = c \frac{\varepsilon_i}{\max_j \varepsilon_j} \triangleq c \frac{\varepsilon_i}{\varepsilon_{\max}}$$

where $SNR_q(i)$ is the SNR of bin i due to quantization noise irrespective of channel gains and thermal noise, $\varepsilon_i$ is the transmitted energy (power) of bin i and $\varepsilon_{max}$ is the maximum actual, but not necessarily allowable, transmitted power in a bin. Once all $\varepsilon_i$ are determined we can determine $g_i$ according to $$g_i = \sqrt{\frac{\varepsilon_{\max}}{\varepsilon_i}}$$

with a normalization factor depending on the number of bits used. The factor c is a conversion factor between the energy ratios and SNR. For example in a specific application it can be seen that $SNR \geq 30$ dB is achieved if $\varepsilon_i \geq 0.125 \varepsilon_{max}$ and therefore $$c = \frac{1000}{0.125} = 8000.$$

We can now combine the SNR due to quantization noise and due to channel attenuation to get $$\sigma_i = \frac{1}{\frac{1}{SNR_q(i)} + \frac{1}{\rho_i \varepsilon_i}} = \varepsilon_i \frac{1}{\frac{1}{\rho_i} + \frac{\varepsilon_{\max}}{c}} \triangleq \varepsilon_i \delta_i$$

Now $\sigma_i$ does not necessarily increase when $\varepsilon_i$ increases because increasing $\varepsilon_i$ might also increase $\varepsilon_{max}$ and while increasing $\sigma_i$ it will decrease all other $\sigma_j$ or which $\varepsilon_j < \varepsilon_{max}$. Therefore even for the simple case $$\sum_{i=1}^{N} \varepsilon_i^{\max} \leq \varepsilon_{budget}$$

the solution will not necessarily be $\varepsilon_j = \varepsilon_j^{max}$.

The formulation of the optimization problem remains the same with the replacement of $\rho_j$ in (4) with $\delta_j$, which is now dependent on $\varepsilon_{max}$ and not just channel attenuation:

Maximize $$R = \sum_{j=1}^{N} b(\varepsilon_j \delta_j)$$

Subject to $0 \leq \varepsilon_j \leq \varepsilon_j^{max}$, $$\sum_{j=1}^{N} \varepsilon_j \leq \varepsilon_{budget}$$

A suboptimal, but acceptable, solution is to use an iterative numerical approach, instead of solving the combined problem. The first step is to optimize the power loading problem as in Baccarelli by assuming transmitting a flat spectrum and possibly violating the peak power limit. In doing so, quantization noise is minimized since all gains are set to the highest value. After estimating the power mask according to Baccarelli's method, the next step is to re-estimate the throughput by adding the quantization noise and computing $\delta_j$. The last phase is to search for the bin or bins with maximum power and reduce the power of each by a certain amount, for example by 1 dB. That will reduce the SNR of that bin by 1 dB, but will also reduce the quantization noise of the other bins. This step is repeated until no further gains in throughput are achieved.

This approach creates a power profile that addresses the peak and overall power constraint of the system and the effect quantization has on setting bin power levels.

The following Matlab program implements the last stage of the algorithm after the optimum solution as in Baccarelli is already computed. This example assumes random TOV (g_db) with 50 dB dynamic range and random SNR between 0 and 40 dB. An inspection of the resulting throughput calculation at each of the iterations shows a peak throughput, which is the best choice. Throughput is expressed as bits per OFDM symbol.

```
th=[7 10 13.5 17 20.5 24 27 30];
c=8000;
delta=1;
N=50;
g_db=floor(rand(1,256)*50+0.5); % random gains
snr_db=rand(1,256)*40; % random snr
g_square=10.^(g_db/10);
snr=10.^(snr_db/10);
snr_q=c*g_square/max(g_square);
snr_combined=1./(1./snr+1./snr_q);
snr_db_combined=10*log10(snr_combined);
bitrate=0;bitrate_q=0;
for i=1:256,
   bitrate=bitrate+sum(snr_db(i)>th);
   bitrate_q=bitrate_q+sum(snr_db_combined(i)>th);
end
bitrate
bitrate_q
bitrate_q=zeros(1,N);
for i1=1:N,
   p=find(g_db==max(g_db));
   g_db(p)=g_db(p)-delta;
   snr_db(p)=snr_db(p)-delta;
   g_square=10.^(g_db/10);
```

```
snr=10.^(snr_db/10);
snr_q=c*g_square/max(g_square);
snr_combined=1./(1./snr+1./snr_q);
snr_db_combined=10*log10(snr_combined);
for i=1:256,
bitrate_q(i1)=bitrate_q(i1)+sum(snr_db_combined(i)
   >th);
end end
```

What is claimed is:

1. A method of transmitting digital information over a coaxial cable communication medium used by network and non-network devices that reduces interference to non-network devices caused by transmissions from network devices, the method comprising:
   determining the susceptibility level of devices sharing the communication medium at each of a plurality of frequencies, the frequencies selected from a predetermined set of carrier frequencies;
   creating a table of power levels, each power level set to a level below the determined susceptibility level;
   separating the digital information into a plurality of channels;
   modulating each of the separated digital information channels using a different carrier frequency to produce a modulated carrier;
   adjusting the power level of each modulated carrier according to the table of power levels; and
   transmitting all modulated carriers over the communication medium.

2. The method of claim 1 further comprising the step of:
   adjusting the modulation order of each modulated carrier according to the table of power level.

3. The method of claim 1 further comprising the steps of:
   adjusting the modulation order for each modulated carrier according to the table of power levels, wherein higher powers are allocated higher order constellations and lower powers are allocated lower order constellations.

4. A method transmitting digital information over a medium used by network and non-network devices that reduces interference to non-network devices caused by transmissions from network devices, where the non-network devices have a predetermined channel spacing and channel bandwidth, the method comprising:
   determining a power level sub-profile used over a frequency band equal to non-network device channel bandwidth;
   modulating digital information onto a plurality of carriers, wherein a plurality of carriers are within one non-network device channel bandwidth; and
   adjusting the power level of each modulated carrier according to the power level sub-profile, applying the power level sub-profile to each non-network device channel frequency band repetitively across the network device bandwidth to create a total power profile.

5. The method of claim 4 wherein the power sub-profile is symmetric across the sub-profile.

6. The method of claim 4 further comprising the step of creating a table of power levels, each power level set to a level below a predetermined susceptibility level;
   adjusting the power level of each modulated carrier according to the table of power levels; and
   transmitting all modulated carriers over the communication medium from a network device.

7. A method for transmitting digital information between networked devices that reduces interference to non-networked devices sharing the communication medium comprising:
   determining the interference susceptibility level of non-networked devices caused by the transmissions in the frequency band used by the networked devices;
   modulating the digital information to form a transmitted power spectrum;
   preceding the transmitted power spectrum with a frequency response that reduces the transmitted power level at the frequencies where non-networked devices have susceptibility; and
   transmitting the precoded transmitted power spectrum over the shared communication medium.

8. The method of claim 7 further comprising the steps of:
   in a receiver, equalizing the received signal to remove the effects of precoding the transmitted power spectrum.

9. The method of claim 8 wherein the equalizing uses an adaptive equalizer.

10. The method of claim 8 wherein the equalizing uses a fixed response equalizer.

* * * * *